US009458345B2

(12) United States Patent
Telford et al.

(10) Patent No.: US 9,458,345 B2
(45) Date of Patent: Oct. 4, 2016

(54) COATING COMPOSITIONS COMPRISING LATEX EMULSIONS AND HYDROXYL FUNCTIONAL OIL POLYOL GRAFT COPOLYMERS

(75) Inventors: David James Telford, Copley, OH (US); Kenneth James Gardner, Independence, OH (US); Ryan Roberts, Sr., Euclid, OH (US); Tiffany Weidendorf, Parma, OH (US); Denise E. Yancey, Cleveland, OH (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 99 days.

(21) Appl. No.: 13/976,830

(22) PCT Filed: Dec. 28, 2011

(86) PCT No.: PCT/EP2011/074117
§ 371 (c)(1),
(2), (4) Date: Jun. 27, 2013

(87) PCT Pub. No.: WO2012/089746
PCT Pub. Date: Jul. 5, 2012

(65) Prior Publication Data
US 2013/0280454 A1 Oct. 24, 2013

Related U.S. Application Data

(60) Provisional application No. 61/427,612, filed on Dec. 28, 2010.

(30) Foreign Application Priority Data

Feb. 10, 2011 (EP) .................................. 11154037

(51) Int. Cl.
*C09D 133/06* (2006.01)
*C09D 151/00* (2006.01)
*C08F 267/06* (2006.01)

(52) U.S. Cl.
CPC ........... *C09D 133/06* (2013.01); *C08F 267/06* (2013.01); *C09D 151/00* (2013.01); *Y10T 428/1352* (2015.01)

(58) Field of Classification Search
CPC C09D 133/06; C09D 163/00; C09D 133/14; C08K 5/42; C08G 63/48
USPC .................. 524/556, 745, 504, 158; 428/35.7
See application file for complete search history.

(56) References Cited

U.S. PATENT DOCUMENTS

| | | |
|---|---|---|
| 2,967,162 A | 1/1961 | Vasta |
| 3,248,356 A | 4/1966 | Snyder |
| 3,390,206 A | 6/1968 | Thompson et al. |
| 4,199,622 A | 4/1980 | Kokumai et al. |
| 4,289,674 A | 9/1981 | Christenson et al. |
| 4,567,246 A | 1/1986 | Gajria et al. |
| 4,692,491 A | 9/1987 | Ranka et al. |
| 4,871,810 A | 10/1989 | Saltman |
| 4,898,911 A | 2/1990 | Miyashita et al. |
| 4,906,684 A | 3/1990 | Say |
| 4,948,834 A | 8/1990 | Baker et al. |
| 5,043,380 A | 8/1991 | Cole |
| 5,082,742 A | 1/1992 | Padwa |
| 5,157,078 A | 10/1992 | Woo et al. |
| 5,629,376 A | 5/1997 | Sargent et al. |
| 5,686,140 A | 11/1997 | Stoffel |
| 5,714,539 A | 2/1998 | Perez et al. |
| 5,811,484 A | 9/1998 | Wilfinger et al. |

(Continued)

FOREIGN PATENT DOCUMENTS

| | | |
|---|---|---|
| CN | 1340076 A | 3/2002 |
| CN | 101243036 A | 8/2008 |

(Continued)

OTHER PUBLICATIONS

European Search Report dated May 27, 2011 for Application No. EP11154037.3.
International Search Report and Written Opinion dated Feb. 22, 2012 for International Application No. PCT/EP2011/074117.
Diehl et al., "Waterborne Mechanical Dispersions of Polyolefins," The Dow Chemical Company, Jan. 24, 2009, pp. 1-14.
Men'Shikova et al., "Synthesis of Carboxylated Monodisperse Latexes and Their Self-Organization in Thin Films," Russian J. of Applied Chem, vol. 78, No. 1 (2005) pp. 159-165.
Mishra et al., "Synthesis and Characterization of . . . Methacrylate Latexes," J. of Applied Polymer Science, vol. 115 (2010) pp. 549-557.
Norakankorn et al., "Synthesis of core/shell structure of glycidyl-funtionalized . . . via different microemulsion polymerization," European Polymer J. 45 (2009) pp. 2977-2986.

(Continued)

*Primary Examiner* — James J Seidleck
*Assistant Examiner* — Deve E Valdez
(74) *Attorney, Agent, or Firm* — Alice C. Su

(57) ABSTRACT

The present invention includes coating compositions and methods for coating substrates using the coating compositions. In some embodiments of the invention, a coating composition is prepared by a method including the steps of a) preparing a latex emulsion by a method including mixing an ethylenically unsaturated monomer component in a carrier to form a monomer emulsion, and reacting the monomer emulsion with an initiator to form the latex emulsion, b) preparing a hydroxyl functional oil graft copolymer by a method including reacting an epoxidized vegetable oil with a hydroxyl functional material in the presence of an acid catalyst to form a hydroxyl functional oil polyol, and reacting the hydroxyl functional oil polyol with an ethylenically unsaturated monomer component in the presence of an initiator to form the hydroxyl functional oil polyol graft copolymer, and c) blending the latex emulsion and a crosslinker then adding the hydroxyl functional oil graft copolymer to form the coating composition. The coating compositions may exhibit no or minimal blush, no or minimal color pick-up, and commercially acceptable adhesion. Substrates coated with the coating compositions of the invention are also disclosed.

30 Claims, No Drawings

(56) References Cited

U.S. PATENT DOCUMENTS

| | | | |
|---|---|---|---|
| 6,040,062 | A | 3/2000 | McGee et al. |
| 6,197,878 | B1 | 3/2001 | Murray et al. |
| 6,586,516 | B1 * | 7/2003 | Kesselmayer et al. ....... 524/475 |
| 7,189,787 | B2 | 3/2007 | O'Brien et al. |
| 7,592,047 | B2 | 9/2009 | O'Brien et al. |
| 7,645,521 | B2 | 1/2010 | Wevers et al. |
| 7,858,162 | B2 | 12/2010 | Fuhry et al. |
| 7,923,513 | B2 | 4/2011 | Killilea et al. |
| 2002/0147270 | A1 | 10/2002 | Kuo et al. |
| 2002/0161108 | A1 | 10/2002 | Schultz et al. |
| 2003/0064185 | A1 | 4/2003 | Mazza et al. |
| 2003/0187128 | A1 | 10/2003 | Shiba et al. |
| 2004/0259989 | A1 | 12/2004 | O'Brien et al. |
| 2005/0196629 | A1 | 9/2005 | Bariatinsky et al. |
| 2006/0100366 | A1 | 5/2006 | O'Brien et al. |
| 2007/0017440 | A1 | 1/2007 | Tang et al. |
| 2007/0036903 | A1 | 2/2007 | Mayr et al. |
| 2007/0117928 | A1 | 5/2007 | O'Brien et al. |
| 2007/0281179 | A1 | 12/2007 | Ambrose et al. |
| 2008/0108728 | A1 | 5/2008 | White et al. |
| 2008/0299343 | A1 | 12/2008 | Vogt et al. |
| 2010/0093913 | A1 | 4/2010 | Jones et al. |
| 2011/0195263 | A1 | 8/2011 | Malotky et al. |
| 2011/0207850 | A1 | 8/2011 | Kan et al. |

FOREIGN PATENT DOCUMENTS

| | | |
|---|---|---|
| DE | 102 25 367 C1 | 9/2003 |
| EP | 1 371 689 A1 | 12/2003 |
| EP | 1 908 798 A1 | 4/2008 |
| EP | 2 009 034 A2 | 12/2008 |
| EP | 2 033 992 A2 | 3/2009 |
| GB | 1100569 | 1/1968 |
| JP | 58-185604 A | 10/1983 |
| JP | 2-232219 A | 9/1990 |
| JP | 2002-138245 A | 5/2002 |
| JP | 2004-250505 A | 9/2004 |
| WO | WO 94/26789 A1 | 11/1994 |
| WO | WO 00/49072 A1 | 8/2000 |
| WO | WO 01/23471 A1 | 4/2001 |
| WO | WO 02/064691 A2 | 8/2002 |
| WO | WO 2004/090020 A1 | 10/2004 |
| WO | WO 2005/080517 A1 | 9/2005 |
| WO | WO 2006/045017 A1 | 4/2006 |
| WO | WO 2007/123659 A1 | 11/2007 |
| WO | WO 2007/138111 A1 | 12/2007 |
| WO | WO 2008/036629 A2 | 3/2008 |
| WO | WO 2009/137014 A1 | 11/2009 |
| WO | WO 2010/019180 A1 | 2/2010 |
| WO | WO 2010/062844 A1 | 6/2010 |
| WO | WO 2010/097353 * | 9/2010 |
| WO | WO 2010/097353 A1 | 9/2010 |
| WO | WO 2010/100121 * | 9/2010 |
| WO | WO 2010/100121 A1 | 9/2010 |
| WO | WO 2010/100122 A1 | 9/2010 |
| WO | WO 2010/114648 A1 | 10/2010 |
| WO | WO 2011/009024 A1 | 1/2011 |
| WO | WO 2011/011705 A2 | 1/2011 |
| WO | WO 2011/011707 A2 | 1/2011 |

OTHER PUBLICATIONS

English language translation for German Patent Application No. DE 102 25 367 C1 (publication date Sep. 18, 2003).

English language translation for Japanese Laid-open Publication No. 53-39387 (publication date Apr. 11, 1978).

Abstract of JP 58-185604 A (publication date Oct. 29, 1983).

Abstract of JP 2-232219 A (publication date Sep. 14, 1990).

English language machine translation of JP 2002-138245 A (publication date May 14, 2002).

Abstract of JP 2004-250505 A (publication date Sep. 9, 2004).

* cited by examiner

COATING COMPOSITIONS COMPRISING LATEX EMULSIONS AND HYDROXYL FUNCTIONAL OIL POLYOL GRAFT COPOLYMERS

This application is the U.S. National Phase of PCT/EP2011/074117 filed on Dec. 28, 2011 and claims the benefit of U.S. Provisional Application No. 61/427,612 filed on Dec. 28, 2010 and European Application No. 11154037.3 filed on Feb. 10, 2011, the entire contents of each of which are incorporated herein by reference.

BACKGROUND OF THE INVENTION

1. Field of the Invention

The present invention relates to high acid large particle size latex emulsions, enhanced stabilization of high acid large particle size latex emulsions, coating compositions formed therefrom, methods of coating substrates with the coating compositions, and substrates coated with the coating compositions.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

International Publication No. WO 2008/036629 discloses a coating composition for food and beverage containers composed of a grafted polyester-acrylate resin that is crosslinked with a phenolic crosslinker and catalyzed by a titanium-containing or zirconium-containing catalyst.

U.S. Patent Application Publication No. 2005/0196629 also discloses a coating composition for food and beverage containers composed of a grafted polyester-acrylate resin that is crosslinked with a phenolic crosslinker.

U.S. Patent Application Publication No. 2006/0100366 uses an acrylic polymer as a dispersant for latex polymerization by combining an ethylenically unsaturated monomer component with a dispersion of a salt of an acid- or anhydride-functional polymer and an amine to form an emulsion.

U.S. Patent Application Publication No. 2007/0117928 and U.S. Pat. No. 7,189,787 disclose the formation of a dispersion which is the reaction product of a tertiary amine with an acid functional polymer and a glycidyl functional polymer.

International Publication No. WO 2007/123659 discloses a coating composition formed by crosslinking an acrylic polymer having a molecular weight greater than 41,000 and an acid value less than 30 mg KOH/g.

U.S. Patent Application Publication No. 2007/0281179 discloses a coating composition having a polyester which is the reaction product of a polyol and a bis-epoxy reacted with a mono- and/or di-phenolic carboxylic acid and/or ester.

Commonly-owned International Publication No. WO 2010/100121 describes the preparation of hydroxyl functional oil polyol acrylic graft copolymers useful as packaging coating compositions. Commonly-owned International Publication No. WO 2010/097353 describes the preparation of latex emulsions useful as packaging coating compositions.

Latexes made by emulsion polymerization have not achieved the performance of epoxy based coatings and have not been successfully used on a commercial basis in food and beverage coating compositions. Some drawbacks have been flavor acceptance in beer and blush performance in pasteurized or retorted hard-to-hold beverages. Typical latex emulsion polymers use sodium salts as buffers and stabilizers, and/or non ionic surfactants which also impart an unacceptable degree of sensitivity to water (blushing).

There is a need to produce coating compositions that do not contain bisphenol A or are substantially free of bisphenol A. The latex emulsions and the hydroxyl functional oil polyol acrylic graft copolymers of the invention can be used in the preparation of coating compositions suitable, inter alia, as packaging coatings for food and beverage packaging and containers.

SUMMARY OF THE INVENTION

The present invention provides an alternate to epoxy resins that still allows formaldehyde free cure, blush resistance, capability to retort and can withstand hard-to-hold beverages. In some embodiments, these beneficial aspects of the invention are achieved using an oil polyol (such as an oil polyol similar to those disclosed in WO '121) as a dispersant for non-water soluble moieties (such as a latex similar to those disclosed in of WO '353). The coating compositions of the invention can be made with a simple process, not requiring multiple polymers or processing stages to achieve the intended effect.

The present invention includes coating compositions and methods for coating substrates using the coating compositions. In some embodiments of the invention, a coating composition comprises: a) a hydroxyl functional oil graft copolymer; b) a latex emulsion; and c) a crosslinker, wherein the weight ratio of the crosslinker to the hydroxyl functional oil graft copolymer is between about 5:1 and about 2:1, and wherein the weight ratio of the latex emulsion to the hydroxyl functional oil graft copolymer is between about 4:1 and about 2:1. In some embodiments, the coating compositions of the invention include up to 12 pph of the hydroxyl functional oil graft copolymer and/or up to 50 pph of a phenolic compound.

The coating compositions may be prepared by a method comprising the steps of a) preparing a latex emulsion by a method comprising mixing an ethylenically unsaturated monomer component in a carrier to form a monomer emulsion, and reacting the monomer emulsion with an initiator to form the latex emulsion, b) preparing a hydroxyl functional oil graft copolymer by a method comprising reacting an epoxidized vegetable oil with a hydroxyl functional material in the presence of an acid catalyst to form a hydroxyl functional oil polyol, and reacting the hydroxyl functional oil polyol with an ethylenically unsaturated monomer component in the presence of an initiator to form the hydroxyl functional oil polyol graft copolymer, and c) blending the latex emulsion and the hydroxyl functional oil graft copolymer to form the coating composition. The coating compositions may exhibit no or minimal blush, no or minimal color pick-up, and commercially acceptable adhesion.

Substrates coated with the coating compositions of the invention are also disclosed. In some embodiments, the substrate is a can or packaging.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

The present invention includes substrates coated at least in part with a coating composition of the invention and methods for coating the substrates. The term "substrate" as used herein includes, without limitation, cans, metal cans, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The present invention includes coating compositions comprising: a) a hydroxyl functional oil graft copolymer; b) a latex emulsion; and c) a crosslinker, wherein the weight ratio of the crosslinker to the hydroxyl functional oil graft copolymer is between about 5:1 and about 2:1, and wherein the weight ratio of the latex emulsion to the hydroxyl functional oil graft copolymer is between about 4:1 and about 2:1. The weight ratio of the crosslinker to the hydroxyl functional oil graft copolymer can be between about 5:1 and about 2:1. The weight ratio of the latex emulsion to the hydroxyl functional oil graft copolymer can be between about 4:1 and about 2:1. These weight ratios may contribute to lower extractables and thereby reduced flavorants. In some embodiments, the coating compositions of the invention include up to 12 pph of the hydroxyl functional oil graft copolymer and/or up to 50 pph of a phenolic compound.

Methods for preparing the coating compositions may include the steps of a) preparing a latex emulsion by a method comprising mixing an ethylenically unsaturated monomer component in a carrier to form a monomer emulsion, and reacting the monomer emulsion with an initiator to form the latex emulsion, b) preparing a hydroxyl functional oil graft copolymer by a method comprising reacting an epoxidized vegetable oil with a hydroxyl functional material in the presence of an acid catalyst to form a hydroxyl functional oil polyol, and reacting the hydroxyl functional oil polyol with an ethylenically unsaturated monomer component in the presence of an initiator to form the hydroxyl functional oil polyol graft copolymer, and c) blending the latex emulsion and the hydroxyl functional oil graft copolymer to form the coating composition. In some embodiments, the latex emulsion is reacted with a neutralizer. The latex emulsion can have an acid value of at least about 35 based on the solids content of the latex.

The latex emulsions used in the present invention are prepared in some embodiments by techniques known in the art, such as without limitation, suspension polymerization, interfacial polymerization, and emulsion polymerization. Emulsion polymerization techniques for preparing latex emulsions from ethylenically unsaturated monomer components are well known in the polymer arts, and any conventional latex emulsion technique can be used, such as for non-limiting example, single and multiple shot batch processes, and continuous processes. If desired, an ethylenically unsaturated monomer component mixture can be prepared and added gradually to the polymerization vessel. The ethylenically unsaturated monomer component composition within the polymerization vessel may be varied during the course of the polymerization, such as, for non-limiting example, by altering the composition of the ethylenically unsaturated monomer component being fed into the vessel. Both single and multiple stage polymerization techniques can be used in some embodiments of the invention. In some embodiments, the latex emulsions are prepared using a seed polymer emulsion to control the number of particles produced by emulsion polymerization as known in the art. The particle size of the latex polymer particles is controlled in some embodiments by adjusting the initial surfactant charge.

The ethylenically unsaturated monomer component used to form the latex emulsion can be composed of a single monomer or a mixture of monomers in various embodiments. In some embodiments, the ethylenically unsaturated monomer component is present in an amount from about 2% to about 50% based on total mixture. The ethylenically unsaturated monomer component may include, without limitation, one or more vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, dicyclopentadiene, an acetoacetate compound including without limitation acetoacetoxy ethyl methacrylate, and combinations thereof. Vinyl alkyl ethers may include without limitation, methyl vinyl ether, isopropyl vinyl ether, n-butyl vinyl ether, isobutyl vinyl ether, and combinations thereof. Acrylic monomers may include without limitation, monomers such as for non-limiting example, lower alkyl esters of acrylic or methacrylic acid having an alkyl ester portion other than methyl or ethyl containing about 3 to about 10 carbon atoms, as well as aromatic derivatives of acrylic and methacrylic acid. Acrylic monomers may include, for non-limiting example, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, butane diol dimethacrylate, various glycidyl ethers reacted with acrylic and methacrylic acids, hydroxyl alkyl acrylates and methacrylates such as without limitation, hydroxyethyl and hydroxy propyl acrylates and methacrylates, and amino acrylates and methacrylates, and combinations thereof.

In some embodiments of the invention, the latex emulsion may include higher levels of methacrylic acid (MAA) and/or higher levels of glycerol dimethacrylate (GDMA) compared to conventional latex emulsions which may use less than 5 pph of methacrylic acid and less than 3 pph of glycidyl methacrylate. The latex emulsions of the present invention include, for non-limiting example, an ethylenically unsaturated monomer component having 5-13 pph of methacrylic acid and 3-12 pph of glycerol dimethacrylate. In addition, the latex emulsions of the present invention may have a higher particle size than the 80-100 nm particle size of some conventional latexes. The latex emulsions of the present invention may include, for non-limiting example, emulsions having a particle size of about 250 to about 350 nm. The combination of the higher levels of methacrylic acid and glycidyl methacrylate and the higher particle size of the latex may help improve spray atomization and coverage, reduce blister formation and maintain pack resistance.

In some embodiments, the ethylenically unsaturated monomer component used to form the latex emulsion includes at least one multi-ethylenically unsaturated monomer component effective to raise the molecular weight and crosslink the polymer. Non-limiting examples of multi-ethylenically unsaturated monomer components include allyl(meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol(meth)acrylate, polyalkylene glycol di(meth)acrylate, diallyl phthalate, trimethylolpropane tri(meth)acrylate, divinylbenzene, divinyltoluene, trivinylbenzene, divinylnaphthalene, and combinations thereof. In some embodiments, the multi-ethylenically unsaturated monomer component is present in an amount from about 0.1 to about 5%.

In some embodiments of the invention, the ethylenically unsaturated monomer component used to form the latex emulsion is mixed with a stabilizer comprising a strong acid to form the monomer emulsion. Optionally, a base is present in the mixture. In some embodiments, the stabilizer is present in an amount from about 0.1% to 2.0% by weight polymeric solids.

Non-limiting examples of stabilizers may include strong acids, such as without limitation, dodecylbenzene sulfonic acid, dinonylnaphthalene sulfonic acid, dinonylnaphthylenedisulfonic acid, bis(2-ethylhexyl)sulfosuccinic acid and the like, as well as combinations thereof. In some embodiments, a strong acid is an acid with a dissociation constant in aqueous solution, pK less than about 4. In some embodiments, the strong acid has a hydrophobe attached to the acid. In some embodiments, the strong acid has at least about six carbon atoms.

Non-limiting examples of a base include ammonia, dimethylethanolamine, 2-dimethylamino-2-methyl-1-propanol, and combinations thereof. In some embodiments, the base is present in an amount of about 50% to 100% mole to mole of stabilizer.

In some embodiments, the carrier used to form the latex emulsion includes, without limitation, water, a water soluble cosolvent, and combinations thereof. The carrier is present in an amount of about 50 to about 90% of the total latex emulsion in some embodiments.

In some embodiments of the invention, the monomer emulsion is reacted with one or more initiators to form a latex emulsion. The initiator may include, for non-limiting example, initiators which thermally decompose at the polymerization temperature to generate free radicals. Examples of initiators include, without limitation, both water-soluble and water-insoluble species, as well as combinations thereof. Examples of free radical-generating initiators may include, for non-limiting example, persulfates, such as without limitation, ammonium or alkali metal (potassium, sodium or lithium) persulfate, azo compounds such as without limitation, 2,2'-azo-bis(isobutyronitrile), 2,2'-azo-bis(2,4-dimethylvaleronitrile), and 1-t-butyl-azocyanocyclohexane), hydroperoxides such as without limitation, t-butyl hydroperoxide and cumene hydroperoxide, peroxides such as without limitation, benzoyl peroxide, caprylyl peroxide, di-t-butyl peroxide, ethyl 3,3'-di(t-butylperoxy) butyrate, ethyl 3,3'-di(t-amylperoxy)butyrate, t-amylperoxy-2-ethyl hexanoate, and t-butylperoxy pivilate, peresters such as without limitation, t-butyl peracetate, t-butyl perphthalate, and t-butyl perbenzoate, percarbonates, such as without limitation, di(1-cyano-1-methylethyl)peroxy dicarbonate, perphosphates, and the like, as well as combinations thereof.

In some embodiments, the initiator is used alone or as the oxidizing component of a redox system, which may include, without limitation, a reducing component such as, for non-limiting example, ascorbic acid, malic acid, glycolic acid, oxalic acid, lactic acid, thiogycolic acid, or an alkali metal sulfite, such as without limitation, a hydrosulfite, hyposulfite or metabisulfite, such as without limitation, sodium hydrosulfite, potassium hyposulfite and potassium metabisulfite, sodium formaldehyde sulfoxylate, or a combinations thereof. The reducing component can be referred to as an accelerator or a catalyst activator.

The initiator and accelerator, which can be referred to as an initiator system, are each employed in some embodiments in proportion from about 0.001% to about 5%, based on the weight of ethylenically unsaturated monomer component to be copolymerized during formation of the latex emulsion. Promoters such as without limitation, chloride and sulfate salts of cobalt, iron, nickel or copper are optionally employed in amounts from about 2 to about 200 parts per million in some embodiments. Non-limiting example of redox catalyst systems include, without limitation, tert-butyl hydroperoxide/sodium formaldehyde sulfoxylate/Fe(II), and ammonium persulfate/sodium bisulfite/sodium hydrosulfite/Fe(II), and combinations thereof. In some embodiments, the polymerization temperature is from about room temperature to about 90° C., and the temperature can be optimized for the initiator system employed, as is conventional.

In some embodiments of the invention, aggregation of polymeric latex particles is limited by including a stabilizing surfactant during polymerization. For non-limiting example, the growing latex particles may be stabilized during emulsion polymerization by one or more surfactants such as, without limitation, dodecylbenzene sulfonic acid, an anionic or nonionic surfactant, or a combination thereof, as is well known in the polymerization art. Other types of stabilizing agents, such as, without limitation, protective colloids, can be used in some embodiments. Generally speaking, conventional anionic surfactants with metal, nonionic surfactants containing polyethylene chains and other protective colloids tend to impart water sensitivity to the resulting films. In some embodiments of the invention, it is desirable to minimize or avoid the use of these conventional anionic and nonionic surfactants. In some embodiments, the stabilizing surfactant is employed during seed polymerization.

Chain transfer agents are used in some embodiments of the invention to control the molecular weight of the latex emulsion. Non-limiting examples of chain transfer agents may include mercaptans, polymercaptans, polyhalogen compounds, alkyl mercaptans such as without limitation, ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan, mercapto carboxylic acids and their esters, such as without limitation, methyl mercaptopropionate and 3-mercaptopropionic acid, alcohols such as without limitation, isopropanol, isobutanol, lauryl alcohol and t-octyl alcohol, halogenated compounds such as without limitation, carbon tetrachloride, tetrachloroethylene, trichloro-bromoethane, and combinations thereof. In some embodiments, from about 0 to about 10% by weight, based on the weight of the ethylenically unsaturated monomer component mixture is used. The latex emulsion molecular weight may be controlled in some embodiments by techniques known in the art, such as without limitation, by the ratio of initiator to ethylenically unsaturated monomer component.

In some embodiments, the initiator system and/or chain transfer agent is dissolved or dispersed in separate fluid mediums or in the same fluid medium, and then gradually added to the polymerization vessel. In some embodiments, the ethylenically unsaturated monomer component used to form the latex emulsion, either neat or dissolved or dispersed in a fluid medium, is added simultaneously with the catalyst and/or the chain transfer agent. The catalyst is added to the polymerization mixture to "chase" residual monomer after polymerization has been substantially completed to polymerize the residual monomer as is well known in the polymerization arts.

In some embodiments, an additional monomer mixture of an ethylenically unsaturated monomer component and a stabilizer is added to the monomer emulsion used to form the latex emulsion. Optionally, a base is present in the additional monomer mixture. The additional monomer mixture can be added to the monomer emulsion in some embodiments prior to addition of the initiator, after addition of the initiator, or both before and after addition of the initiator. The compositions of the ethylenically unsaturated monomer component, stabilizer and base in the additional monomer mixture can be the same as or different than the compositions of these components in the monomer emulsion.

The latex emulsion may be reacted with a neutralizer in some embodiments of the invention. In some embodiments, the reaction occurs in the presence of a solvent. For non-limiting example, the solvent may include a ketone, an aromatic solvent, an ester solvent, a hydroxyl functional solvent, or a combination thereof. In some embodiments, the solvent is present in an amount from about 0% to about 90% by weight polymeric solids.

In some embodiments, the neutralizer may include, without limitation, ammonia, a tertiary amine, such as, for non-limiting example, dimethylethanolamine, 2-dimethylamino-2-methyl-1-propanol, tributylamine, or a combination thereof. For non-limiting example, the neutralizer may be employed in an amount from about 0% to about 100% based on of the amount of acid to be neutralized in the system.

The latex emulsions, the hydroxyl functional oil polyol graft copolymers and the coating compositions of the invention can include conventional additives known to those skilled in the art, such as without limitation, additives to control foam, reduce equilibrium and dynamic surface tension, control rheology and surface lubricity. Amounts can vary depending on desired coating application and performance in any manner known to those skilled in the art.

The hydroxyl functional oil polyol graft copolymers of the invention can be prepared by reacting an epoxidized vegetable oil with a hydroxyl functional material in the presence of an acid catalyst to form a hydroxyl functional oil polyol, and reacting the hydroxyl functional oil polyol with an ethylenically unsaturated monomer component in the presence of an initiator to form the hydroxyl functional oil polyol graft copolymer. In some embodiments of the invention, the hydroxyl functional oil polyol graft copolymer is crosslinked with a crosslinker.

In some embodiments of the invention, the hydroxyl functional oil polyol graft copolymer may include, for non-limiting example, an ethylenically unsaturated monomer component that includes without limitation non-functional ethylenically unsaturated monomers such as, for non-limiting example, butyl acrylate, methyl methacrylate, styrene, and the like, and optionally with lesser amounts of functional monomers such as, for non-limiting example, hydroxy propyl methacrylate, hydroxy ethyl acrylate, glycidyl methacrylate, acrylic acid, methacrylic acid and the like, as well as combinations thereof. In some embodiments of the invention, hydroxyl functional monomers are added at a level of about 0 to about 30% by weight of the ethylenically unsaturated monomer component mixture, and acid functional monomers are added at a level of about 0 to about 30% by weight of the ethylenically unsaturated monomer component mixture.

The hydroxyl functional oil polyol graft copolymer in some embodiments of the invention may contain non-functional and/or hydroxyl functional monomers as listed above, with higher levels of an acid functional monomer to render the composition water dispersible. In some embodiments, about 10 to about 50% by weight of the ethylenically unsaturated monomer component mixture is an acid functional monomer. In some embodiments, the acid functional monomer is methacrylic acid. In that case, the hydroxyl functional oil polyol graft copolymer may be inverted into water by adding a neutralizing base, such as without limitation, ammonia or a tertiary amine such as without limitation, dimethyl ethanol amine, and water. Final NV (non-volatile content by weight) is about 15 to about 40% by weight in some embodiments.

The epoxidized vegetable oil can be used alone or in combination with other epoxidized vegetable oils. Epoxidized vegetable oils can be prepared from vegetable oils by, for non-limiting example, adding hydrogen peroxide and formic or acetic acid to the vegetable oil, and then holding the mixture at an elevated temperature until some or all of the carbon-carbon double bonds are converted to epoxide groups.

Vegetable oils contain primarily glycerides which are triesters of glycerol and fatty acids with varying degrees of unsaturation. For non-limiting example, epoxidized vegetable oils for use in the invention can be made from vegetable oils (fatty acid triglycerides) such as without limitation, esters of glycerol and fatty acids having an alkyl chain of about 12 to about 24 carbon atoms. Fatty acid glycerides which are triglycerides in unsaturated glyceride oils are generally referred to as drying oils or semidrying oils. Drying oils may include, for non-limiting example, linseed oil, perilla oil and combinations thereof, while semidrying oils may include, without limitation, tall oil, soy bean oil, safflower oil and combinations thereof. Triglyceride oils in some embodiments have identical fatty acid chains or alternatively have different fatty acid chains attached to the same glycerol molecule. In some embodiments, the oils have fatty acid chains containing non-conjugated double bonds. In some embodiments, single double bond or conjugated double bond fatty acid chains are used in minor amounts. Double bond unsaturation in glycerides can be measured by iodine value (number) which indicates the degree of double bond unsaturation in the fatty acid chains. Unsaturated fatty acid glyceride oils employed in some embodiments of the invention have an iodine value greater than about 25 and alternatively about 100 and about 210.

Naturally occurring vegetable oils for use in the invention can be for non-limiting example, mixtures of fatty acid chains present as glycerides, and may include without limitation a distribution of fatty acid esters of glyceride, where the fatty acid distribution may be random but within an established range that may vary moderately depending on the growing conditions of the vegetable source. Soy bean oil is employed in some embodiments which comprises about 11% palmitic, about 4% stearic, about 25% oleic, about 51% linolenic, and about 9% linoleic fatty acids, where oleic, linoleic and linolenic are unsaturated fatty acids. Unsaturated vegetable oils employed in some embodiments of the invention may include without limitation glyceride oils containing non-conjugated unsaturated fatty acid glyceride esters such as, without limitation, linoleic and linolenic fatty acids.

Unsaturated glyceride oils may include, without limitation, corn oil, cottonseed oil, grapeseed oil, hempseed oil, linseed oil, wild mustard oil, peanut oil, perilla oil, poppyseed oil, rapeseed oil, safflower oil, sesame oil, soy bean oil, sunflower oil, canola oil, tall oil, and combinations thereof. Fatty acid glycerides for use in the invention may include, for non-limiting example, those which contain linoleic and linolenic fatty acid chains, oils such as without limitation, hempseed oil, linseed oil, perilla oil, poppyseed oil, safflower oil, soy bean oil, sunflower oil, canola oil, tall oil, grapeseed oil, rattonseed oil, corn oil, and similar oils which contain high levels of linoleic and linolenic fatty acid glyceride. Glycerides can contain lesser amounts of saturated fatty acids in some embodiments. For non-limiting example, soy bean oil can be employed which contains predominantly linoleic and linolenic fatty acid glycerides. Combinations of such oils may be used in some embodiments of the invention. Vegetable oils can by fully or partially epoxidized by known processes, such as for non-limiting example, using acids such as, without limitation, peroxy acid for epoxidation of unsaturated double bonds of the unsaturated vegetable oil. Unsaturated glyceride oils used in some embodiments may include mono-, di-glycerides and combinations thereof with tri-glycerides or fatty acid esters of saturated and unsaturated fatty acids.

In some embodiments, the epoxidized vegetable oil may comprise corn oil, cottonseed oil, grapeseed oil, hempseed oil, linseed oil, wild mustard oil, peanut oil, perilla oil, poppyseed oil, rapeseed oil, safflower oil, sesame oil, soy bean oil, sunflower oil, canola oil, tall oil, a fatty acid ester, monoglyceride or diglyceride of such oils, or a combination thereof.

Commercially available sources of epoxidized vegetable oils are used in some embodiments of the invention such as, for non-limiting example, epoxidized soy oil sold under the trade designations "VIKOLOX" and "VIKOFLEX 7170" available from Arkema, Inc, "DRAPEX 6.8" available from Chemtura Corporation, and "PLAS-CHECK 775" available from Ferro Corp. Other epoxidized vegetable oils for use in the invention may include, for non-limiting example, epoxidized linseed oil sold under the trade designations "VIKOFLEX 7190" available from Arkema, Inc. and "DRAPEX 10.4" available from Chemtura Corporation, epoxidized cotton seed oil, epoxidized carthamus oil and mixtures thereof. Epoxidized soy bean oil is employed in some embodiments.

In some embodiments of the invention, the hydroxyl functional material may include, without limitation, propylene glycol, ethylene glycol, 1,3-propane diol, neopentyl glycol, trimethylol propane, diethylene glycol, a polyether glycol, a polyester, a polycarbonate, a polyolefin, a hydroxyl functional polyolefin, or a combination thereof. The hydroxyl functional material may include an alcohol in some embodiments such as, without limitation, n-butanol, 2-ethyl hexanol, benzyl alcohol, and the like, alone, or in combination with a diol or polyol.

In some embodiments, the hydroxyl functional material may be present in an amount from about 1:99 to about 95:5 in a weight ratio of hydroxyl functional material to epoxidized vegetable oil, and alternatively from about 5:95 to about 40:60. In some embodiments, the equivalent ratio of hydroxyl functionality of the hydroxyl functional material to oxirane functionality in the epoxidized vegetable oil is from about 0.1:1 to about 3:1. In some embodiments, the equivalent ratio of hydroxyl functionality to oxirane functionality in the epoxidized vegetable oil is from about 0.2:1 to about 3:1. In some embodiments, the equivalent ratio of hydroxyl functionality to oxirane functionality in the epoxidized vegetable oil is about 0.2:1.

The acid catalyst which may be used to facilitate the reaction of the epoxidized vegetable oil with the hydroxyl functional material can be a strong acid catalyst such as, for non-limiting example, one or more sulfonic acids or another strong acid (an acid with a pKa about 3 or less), a triflic acid, a triflate salt of a metal of Group IIA, IIB, IIIA, IIIB or VIIIA of the Periodic Table of Elements (according to the IUPAC 1970 convention), a mixture of said triflate salts, or a combination thereof. In some embodiments, the amount of the acid catalyst can range from about 1 ppm to about 10,000 ppm, and alternatively from about 10 ppm to about 1,000 ppm, based on the total weight of the reaction mixture. Catalysts may include, for non-limiting example, the Group IIA metal triflate catalysts such as without limitation magnesium triflate, the Group IIB metal triflate catalysts such as without limitation zinc and cadmium triflate, the Group IIIA metal triflate catalysts such as without limitation lanthanum triflate, the Group IIIB metal triflate catalysts such as without limitation aluminum triflate, and the Group VIIIA metal triflate catalysts such as without limitation cobalt triflate, and combinations thereof. The amount of the metal triflate catalyst can range, for non-limiting example, from about 10 to about 1,000 ppm, alternatively from about 10 to about 200 ppm, based on the total weight of the reaction mixture. Some embodiments of the invention employ a metal triflate catalyst in the form of a solution in an organic solvent. Examples of solvents may include, without limitation, water, alcohols such as n-butanol, ethanol, propanol, and the like, as well as aromatic hydrocarbon solvents, cycloaliphatic polar solvents such as, for non-limiting example, cycloaliphatic ketones (e.g. cyclohexanone), polar aliphatic solvents, such as, for non-limiting example, alkoxyalkanols, 2-methoxyethanol, non hydroxyl functional solvents, and combinations thereof.

In some embodiments, the epoxidized vegetable oil and hydroxyl functional material are heated in the presence of an acid catalyst to a temperature of about 50 to about 200° C. Optionally, a solvent can be included in the synthesis of the epoxidized vegetable oil and hydroxyl functional material to help control viscosity. In some embodiments, the solvent may include, for non-limiting example, a ketone such as, without limitation, methyl amyl ketone, an aromatic solvent such as, without limitation, xylene or Aromatic 100, an ester solvent or other non-hydroxyl functional solvent, or a combination thereof. About 0 to about 90% of a solvent based on the total weight reaction mixture may be employed in various embodiments of the invention, and alternatively about 5 to about 30% may be employed. After about 2 to about 3 hours in some embodiments, greater than 90% of the epoxide groups may be consumed. Solvents selected from those described above as well as other solvents including, without limitation, hydroxyl functional solvents can be added upon cooling. In some embodiments, it is desirable to have a final NV (non-volatile content by weight) of about 30 to about 80.

In some embodiments, an ethylenically unsaturated monomer component and an initiator are reacted with the hydroxyl functional oil polyol to form a hydroxyl functional oil polyol graft copolymer. The ethylenically unsaturated monomer component and the initiator can be added after the hydroxyl functional oil polyol is cooled. In some embodiments, the ethylenically unsaturated monomer component and initiator are added over about 2 hours. In some embodiments, the reaction product of the hydroxyl functional oil polyol, ethylenically unsaturated monomer component and initiator is cooled after about a 1 hour hold to form the hydroxyl functional oil polyol graft copolymer.

The ethylenically unsaturated monomer component used to form the hydroxyl functional oil polyol graft copolymer can be composed of a single monomer or a mixture of monomers. The ethylenically unsaturated monomer component may include, without limitation, one or more or a mixture of vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, dicyclopentadiene, or a combination thereof. Vinyl alkyl ethers may include without limitation, methyl vinyl ether, isopropyl vinyl ether, n-butyl vinyl ether, isobutyl vinyl ether, or a combination thereof. Acrylic monomers may include without limitation, monomers such as for non-limiting example, lower alkyl esters of acrylic or methacrylic acid having an alkyl ester portion containing between about 1 to about 10 carbon atoms, as well as aromatic derivatives of acrylic and methacrylic acid, as well as combinations thereof. Acrylic monomers may include, for non-limiting example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, glycidyl acrylate and methacrylate, and amino acrylates and methacrylates, or a combination thereof.

In some embodiments, the weight ratio of the ethylenically unsaturated monomer component to the hydroxyl functional oil polyol is from about 1:99 to about 99:1, alternatively from about 5:95 to about 95:5, and alternatively from about 30:70 to about 70:30.

Various initiators may be employed alone or in combination in some embodiments of the invention. In some embodiments, initiators with high grafting efficiencies are employed. The initiator may include without limitation, azo compounds such as for non-limiting example, 2,2'-azo-bis (isobutyronitrile), 2,2'-azo-bis(2,4-dimethylvaleronitrile), and 1-t-butyl-azocyanocyclohexane), hydroperoxides such as for non-limiting example, t-butyl hydroperoxide and cumene hydroperoxide, peroxides such as for non-limiting example, benzoyl peroxide, caprylyl peroxide, di-t-butyl peroxide, ethyl 3,3'-di(t-butylperoxy)butyrate, ethyl 3,3'-di (t-amylperoxy)butyrate, t-amylperoxy-2-ethyl hexanoate, 1,1,3,3-tetramethylbutyl-peroxy-2-ethylhexanoate, and t-butylperoxy pivilate, peresters such as for non-limiting example, t-butyl peracetate, t-butyl perphthalate, and t-butyl perbenzoate, as well as percarbonates, such as for non-limiting example, di(1-cyano-1-methylethyl)peroxy dicarbonate, perphosphates, t-butyl peroctoate, and the like, as well as combinations thereof.

In some embodiments, the initiator may be present in an amount from about 0.1 to about 15%, and alternatively from about 1 to about 5%, based on the weight of the monomer mixture.

The temperature chosen for grafting the ethylenically unsaturated monomer component may vary with the half life of the selected initiator in some embodiments on the invention. For non-limiting example, at 130° C. t-butyl peroxy benzoate has a half life of about 30 minutes and can be employed for grafting. Dibenzoyl peroxide has a 30 minute half life at 100° C., and 100° C. could be a temperature to graft the hydroxyl functional oil polyol with dibenzoyl peroxide in some embodiments of the invention. Broadly, depending on the half life of the initiator used, the reaction can be carried out from about 50 to about 200° C.

In some embodiments, one or more mixtures of an initiator with or without a solvent may be added after formation of the hydroxyl functional oil polyol graft copolymer to reduce the free monomer content. The compositions of the initiator and solvent in these one or more mixtures can be the same as or different than the compositions of these components used to form the hydroxyl functional oil polyol graft copolymer.

In some embodiments, the hydroxyl functional oil polyol graft copolymer is mixed with a crosslinker. A non-limiting list of crosslinkers for use in the invention include benzoguanamine, benzoguanamine formaldehyde, glycoluril, melamine formaldehyde, a phenolic crosslinker, phenol formaldehyde, urea formaldehyde, an isocyanate, a blocked isocyanate, and combinations thereof. Internal latex crosslinkers include but are not limited to 1,3-butanediol di(meth) acrylate, 1,4-butanediol di(meth)acrylate, ethylene di(meth) acrylate, ethylene glycol di(meth)acrylate, n-isobutoxymethalol acrylic, and combinations thereof. In various embodiments, the crosslinker to hydroxyl functional oil polyol graft copolymer ratio is about 1:99 to about 90:10, and alternatively about 5:95 to about 60:40. Optionally, the mixture of the hydroxyl functional oil polyol graft copolymer and crosslinker can occur in the presence of a cure catalyst. Cure catalysts may include, for non-limiting example, dodecyl benzene sulfonic acid, p-toluene sulfonic acid, phosphoric acid, and the like, as well as combinations thereof. In some embodiments, other polymers may blended, such as without limitation, polyethers, polyesters, polycarbonates, polyurethanes and the like, as well as combinations thereof. Cure conditions for packaging coatings in some embodiments are about 10 to about 60 seconds at about 500° F. to about 600° F., and alternatively about 1 minute to about 20 minutes at about 250° F. to about 500° F.

The latex emulsions of the invention can be blended with the hydroxyl functional oil graft copolymers of the invention to produce coating compositions. The hydroxyl functional oil graft copolymers can be considered to function as a polymeric surfactant.

The coating compositions of the invention may include conventional additives known to those skilled in the art, such as without limitation, flow agents, surface active agents, defoamers, anti-cratering additives, lubricants, meat-release additives, and cure catalysts.

One or more coating compositions of the invention are applied to a substrate in some embodiments, such as for non-limiting example, cans, metal cans, packaging, containers, receptacles, can ends, or any portions thereof used to hold or touch any type of food or beverage. In some embodiments, one or more coatings are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition may contain, for non-limiting example, about 10% and about 30% by weight polymeric solids relative to about 70% to about 90% water including other volatiles such as, without limitation, minimal amounts of solvents, if desired. For some applications, typically those other than spraying, the aqueous polymeric dispersions can contain, for non-limiting example, about 20% and about 60% by weight polymer solids. Organic solvents are utilized in some embodiments to facilitate spray or other application methods and such solvents include, without limitation, n-butanol, 2-butoxy-ethanol-1, xylene, toluene, and mixtures thereof. In some embodiments, n-butanol is used in combination with 2-butoxy-ethanol-1. The coating compositions of the present invention may be pigmented and/or opacified with known pigments and opacifiers in some embodiments. For many uses, including food use for non-limiting example, the pigment is titanium dioxide. The resulting aqueous coating composition may be applied in some embodiments by conventional methods known in the coating industry. Thus, for non-limiting example, spraying, rolling, dipping, and flow coating application methods can be used for both clear and pigmented films. In some embodiments, after application onto a substrate, the coating may be cured thermally at temperatures in the range from about 130° C. to about 250° C., and alternatively higher for time sufficient to effect complete curing as well as volatilizing of any fugitive component therein.

For substrates intended as beverage containers, the coating compositions may be applied in some embodiments at a rate in the range from about 0.5 to about 15 milligrams of polymer coating per square inch of exposed substrate surface. In some embodiments, the water-dispersible coating is applied at a thickness between about 1 and about 25 microns

EXAMPLES

The invention will be further described by reference to the following non-limiting examples. It should be understood that variations and modifications of these examples can be made by those skilled in the art without departing from the spirit and scope of the invention.

Example 1

To 1150.0 g of demineralized water was added 5.5 g of Aersol MA-80I, 1.0 g of ammonium bicarbonate and 5.0 g of demineralized water. The mixture was heated to 78° C. under a nitrogen sparge. When temperature was reached, the sparge was replaced with a nitrogen blanket. 6.0 g of styrene and 14.0 g of ethyl acrylate were added then mixed for 10 minutes. 4.0 g of ammonium persulfate and 18.0 g of demineralized water were added to the resulting mixture and held for 20 minutes. Following the hold, 200.0 g of styrene, 92 g of ethyl acrylate, 30.0 g of methylmethacrylate, 20 g of 1,3-glycerol dimethacrylate and 1.5 g of Monawet MT70 were fed in over 100 min. Next, a feed consisting of 294.0 g of styrene, 124 g of ethyl acrylate, 60.0 g of methacrylic acid, 60.0 g of 1,3-glycerol dimethacrylate, 100.0 g of acetoacetoxy ethyl acrylate, and 1.5 g of Monawt MT70 were fed in over 110 min. Upon completion of the feeds, the mixture was held for 10-15 minutes, and then a mixture of 10.0 g of demineralized water, 1.0 g of ascorbic acid and 0.0001 g of iron sulfate was added and held for 5 min. Next, 2.5 g of t-butyl perbenzoate and 10.0 g of demineralized water were added and held for 60 minutes at 78° C. The pump was then rinsed with demineralized water and 1300.0 g of demineralized water were added to the batch. The batch was reheated to 75° C. and at 75° C. 35.0 g of dimethylethanolamine and 300.0 g of demineralized water were added. The mixture was held at 75° C. for 30 minutes, then cooled to 38° C. and filtered.

Example 2

To 1150.0 g of demineralized water was added 5.5 g of Aersol MA-80I, 1.0 g of ammonium bicarbonate and 5.0 g of demineralized water. The mixture was heated to 78° C. under a nitrogen sparge. When temperature was reached, the sparge was replaced with a nitrogen blanket. 6.0 g of styrene and 14.0 g of ethyl acrylate were added then mixed for 10 minutes. 4.0 g of ammonium persulfate and 18.0 g of demineralized water were added to the resulting mixture and held for 20 minutes. Following the hold, 200.0 g of styrene, 120.0 g of ethyl acrylate, 30.0 g of methacrylic acid and 1.5 g of Monawet MT70 were fed in over 100 min. Next, a feed consisting of 294.0 g of styrene, 166 g of ethyl acrylate, 40 g of methacrylic acid, 80 g of 1,3-glycerol dimethacrylate, 50 g of acetoacetoxy ethyl acrylate, and 1.5 g of Monawet MT70 were fed in over 110 min. Upon completion of the feeds, the mixture was held for 10-15 minutes, and then a mixture of 10.0 g of demineralized water, 1.0 g of ascorbic acid and 0.00001 g of iron sulfate was added and held for 5 min. Next, 2.5 g of t-butyl perbenzoate and 10.0 g of demineralized water were added and held for 60 minutes at 78° C. The pump was then rinsed with demineralized water and 1300.0 g of demineralized water were added to the batch. The batch was reheated to 75° C. and at 75° C. 35.0 g of dimethylethanolamine and 300.0 g of demineralized water were added. The mixture was held at 75° C. for 30 minutes, then cooled to 38° C. and filtered.

Example 3

To 1150.0 g of demineralized water was added 5.5 g of Aersol MA-80I, 1.0 g of ammonium bicarbonate and 5.0 g of demineralized water. The mixture was heated to 78° C. under a nitrogen sparge. When temperature was reached, the sparge was replaced with a nitrogen blanket. 6.0 g of styrene and 14.0 g of ethyl acrylate were added then mixed for 10 minutes. 4.0 g of ammonium persulfate and 18.0 g of demineralized water were added to the resulting mixture and held for 20 minutes. Following the hold, 200.0 g of styrene, 60 g of ethyl acrylate, 30 g methacrylic acid and 1.5 g of Monawet MT70 were fed in over 100 min. Next, a feed consisting of 294 g of styrene, 76 g of ethyl acrylate, 40 g of methacrylic acid, 80 g of 1,3-glycerol dimethacrylate, 200 g of acetoacetoxy ethyl acrylate, and 1.5 g of Monawet MT70 were fed in over 110 min. Upon completion of the feeds, the mixture was held for 10-15 minutes, and then a mixture of 10.0 g of demineralized water, 1.0 g of ascorbic acid and 0.00001 g of iron sulfate was added and held for 5 min. Next, 2.5 g of t-butyl perbenzoate and 10.0 g of demineralized water were added and held for 60 minutes at 78° C. The pump was then rinsed with demineralized water and 1300.0 g of demineralized water were added to the batch. The batch was reheated to 75° C. and at 75° C. 35.0 g of dimethylethanolamine and 300.0 g of demineralized water were added. The mixture was held at 75° C. for 30 minutes, then cooled to 38° C. and filtered.

Example 4

To 2697.12 g demineralized water was added a mixture of 2.01 g of 70% dodecylbenzene sulfonic acid in iPrOH, 9.4 g demineralized water and 0.28 g 28% ammonia. The mixture was heated to 80° C. under a nitrogen sparge. When temperature was reached, the sparge was replaced with a nitrogen blanket. 93.98 g of a monomer mixture with composition; 18% styrene, 13% methacrylic acid, 51.25% butyl acrylate, 5.75% glycidyl methacrylate and 12% hydroxypropyl methacrylate was added and mixed for 15 min. Then, a mixture of 36.14 g demineralized water and 4.70 g ammonium persulfate was added and held for 15 min. Following the hold, 845.78 g of a monomer mixture identical to the one above was fed in over 180 min. Additionally, a co-feed consisting of 140.96 g demineralized water, 2.01 g of 70% dodecylbenzene sulfonic acid in iPrOH and 0.28 g 28% ammonia was fed in over 180 min. Upon completion of the feeds, a mixture of 84.58 g demineralized water, 0.94 g ascorbic acid and 0.001 g iron (II) sulfate was added followed by a mixture of 9.4 g demineralized water and 2.35 g t-butyl perbenzoate. The reaction was held for 15 minutes and then a mixture of 23.35 g demineralized water and 46.72 g dimethylethanolamine was added and held for 60 min then cooled.

To 2500 g of the above latex was added a mixture of 359.6 g butanol, 88.1 g 2-butoxyethanol, 7.5 g 2-hexoxyethanol and 5.9 g Surfynol 420. Then, 113.2 g demineralized water was added and mixed for 30 min.

Example 5

To 2319.04 g demineralized water was added a mixture of 1.72 g of 70% dodecylbenzene sulfonic acid in iPrOH, 8.02 g demineralized water and 0.24 g 28% ammonia. The mixture was heated to 80° C. under a nitrogen sparge. When temperature was reached, the sparge was replaced with a nitrogen blanket. 80.16 g of a monomer mixture with composition; 60% styrene, 12% methacrylic acid, 8% butyl acrylate, 12% glycidyl methacrylate and 8% hydroxypropyl methacrylate was added and mixed for 15 min. Then, a mixture of 30.84 g demineralized water and 4.01 g ammonium persulfate was added and held for 15 min. Following the hold, 721.58 g of a monomer mixture identical to the one above was fed in over 180 min. Additionally, a co-feed consisting of 120.26 g demineralized water, 1.72 g of 70% dodecylbenzene sulfonic acid in iPrOH and 0.24 g 28% ammonia was fed in over 180 min. Upon completion of the feeds, a mixture of 72.16 g demineralized water, 0.80 g ascorbic acid and 0.001 g iron (II) sulfate was added followed by a mixture of 8.02 g demineralized water and 2.0 g t-butyl perbenzoate. The reaction was held for 15 minutes and then a mixture of 49.81 g demineralized water and 49.81 g dimethylethanolamine was added and held for 60 min. Then, a mixture of 200.44 g butanol, 200.44 g 2-butoxyethanol and 200.44 g Dowanol PnB was added and held 60 min. The mixture was cooled and 120.26 g demineralized water and 8.02 g Surfynol 420 was added and mixed for 15 min.

Example 6

To 2283.95 g demineralized water was added a mixture of 1.70 g of 70% dodecylbenzene sulfonic acid in iPrOH, 7.96 g demineralized water and 0.24 g 28% ammonia. The mixture was heated to 80° C. under a nitrogen sparge. When temperature was reached, the sparge was replaced with a nitrogen blanket. 79.58 g of a monomer mixture with composition outlined in Table 1 below was added and mixed for 15 min (Example 6 was performed five times respectively using the monomer mixture Samples A, B, C, D, then E shown in Table 1). Then, a mixture of 30.61 g demineralized water and 3.98 g ammonium persulfate was added and held for 15 min. Following the hold, 716.22 g of a monomer mixture identical to the one above was fed in over 180 min. Additionally, a co-feed consisting of 119.37 g demineralized water, 1.70 g of 70% dodecylbenzene sulfonic acid in iPrOH and 0.24 g 28% ammonia was fed in over 180 min. Upon completion of the feeds, a mixture of 71.62 g demineralized water, 0.80 g ascorbic acid and 0.001 g iron (II) sulfate was added followed by a mixture of 7.96 g demineralized water and 1.99 g t-butyl perbenzoate. The reaction was held for 15 minutes and then a mixture of 29.66 g demineralized water and 29.66 g dimethylethanolamine was added and held for 60 min. Then, a mixture of 119.37 g butanol, 119.37 g 2-butoxyethanol and 119.37 g Dowanol PnB was added and held 60 min. The mixture was cooled and 246.7 g demineralized water and 7.96 g Surfynol 420 was added and mixed for 15 min. Then, a mixture of 79.6 g butanol, 79.6 g 2-butoxy-ethanol and 79.6 g Dowanol PnB was added. Then, a mixture of dimethylethanolamine and demineralized water as outlined in Table 2 below and mixed for 30 min (Example 6 was performed five times respectively using the dimethylethanolamine and water mixture Samples A, B, C, D, then E shown in Table 1).

TABLE 1

Monomer levels in Example 6.

| Sample | % Styrene | % MAA | % BA | % GMA | % HPMA |
|---|---|---|---|---|---|
| A | 65 | 9 | 19 | 3 | 4 |
| B | 67 | 6 | 18 | 1 | 8 |
| C | 35 | 10.5 | 45.5 | 3 | 6 |
| D | 0 | 10.5 | 79.5 | 10 | 0 |
| E | 21 | 12 | 54 | 5 | 0 |

TABLE 2

Amount of Amine and Water in Example 6.

| Sample | g DMEA | g Water |
|---|---|---|
| A | 12.5 | 12.5 |
| B | 30.0 | 30.0 |
| C | 15.0 | 15.0 |
| D | 20.0 | 20.0 |
| E | 40.0 | 40.0 |

Example 7

To 2561.20 g demineralized water was added a mixture of 1.91 g of 70% dodecylbenzene sulfonic acid in iPrOH, 8.92 g demineralized water and 0.27 g 28% ammonia. The mixture was heated to 80° C. under a nitrogen sparge. When temperature was reached, the sparge was replaced with a nitrogen blanket. 89.24 g of a monomer mixture with composition; 70% styrene, 12% methacrylic acid, 8% butyl acrylate, 2% butanediol dimethacrylate and 8% hydroxypropyl methacrylate was added and mixed for 15 min. Then, a mixture of 34.32 g demineralized water and 4.46 g ammonium persulfate was added and held for 15 min. Following the hold, 803.15 g of a monomer mixture identical to the one above was fed in over 180 min. Additionally, a co-feed consisting of 133.86 g demineralized water, 1.91 g of 70% dodecylbenzene sulfonic acid in iPrOH and 0.27 g 28% ammonia was fed in over 180 min. Upon completion of the feeds, a mixture of 80.31 g demineralized water, 0.89 g ascorbic acid and 0.001 g iron (II) sulfate was added followed by a mixture of 8.92 g demineralized water and 2.23 g t-butyl perbenzoate. The reaction was held for 15 minutes and then a mixture of 33.26 g demineralized water and 33.26 g dimethylethanolamine was added and held for 60 min. Then, a mixture of 133.86 g butanol, 133.86 g 2-butoxyethanol and 133.86 g Dowanol PnB was added and held 60 min. The mixture was cooled and then a mixture of 90.33 g butanol, 90.33 g 2-butoxyethanol and 90.33 g Dowanol PnB was added. Then, a mixture of 7.5 g dimethylethanolamine in 7.5 g demineralized water was added and mixed 30 min.

Example 8

To 2561.20 g demineralized water was added a mixture of 1.91 g of 70% dodecylbenzene sulfonic acid in iPrOH, 8.92 g demineralized water and 0.27 g 28% ammonia. The mixture was heated to 80° C. under a nitrogen sparge. When temperature was reached, the sparge was replaced with a nitrogen blanket. 89.24 g of a monomer mixture with composition; 70% styrene, 12% methacrylic acid, 8% butyl acrylate, 2% ethyleneglycol dimethacrylate and 8% hydroxypropyl methacrylate was added and mixed for 15 min. Then, a mixture of 34.32 g demineralized water and 4.46 g ammonium persulfate was added and held for 15 min. Following the hold, 803.15 g of a monomer mixture identical to the one above was fed in over 180 min. Additionally, a co-feed consisting of 133.86 g demineralized water, 1.91 g of 70% dodecylbenzene sulfonic acid in iPrOH and 0.27 g 28% ammonia was fed in over 180 min. Upon completion of the feeds, a mixture of 80.31 g demineralized water, 0.89 g ascorbic acid and 0.001 g iron (II) sulfate was added followed by a mixture of 8.92 g demineralized water and 2.23 g t-butyl perbenzoate. The reaction was held for 15 minutes and then a mixture of 33.26 g demineralized water and 33.26 g dimethylethanolamine was added and held for 60 min. Then, a mixture of 133.86 g butanol, 133.86 g 2-butoxyethanol and 133.86 g Dowanol PnB was added and held 60 min. The mixture was cooled and then a mixture of 90.33 g butanol, 90.33 g 2-butoxyethanol and 90.33 g Dowanol PnB was added. Then, a mixture of 5.0 g dimethylethanolamine in 5.0 g demineralized water was added and mixed 30 min.

Example 9

To 2288.50 g demineralized water was added a mixture of 1.71 g of 70% dodecylbenzene sulfonic acid in iPrOH, 7.97 g demineralized water and 0.24 g 28% ammonia. The mixture was heated to 80° C. under a nitrogen sparge. When temperature was reached, the sparge was replaced with a nitrogen blanket. 79.74 g of a monomer mixture with composition; 62.1% styrene, 12% methacrylic acid, 15.9% ethyl acrylate, 2% butanediol dimethacrylate and 8% hydroxypropyl methacrylate was added and mixed for 15 min. Then, a mixture of 30.67 g demineralized water and 3.99 g ammonium persulfate was added and held for 15 min. Following the hold, 717.65 g of a monomer mixture identical to the one above was fed in over 180 min. Additionally, a co-feed consisting of 119.61 g demineralized water, 1.71 g of 70% dodecylbenzene sulfonic acid in iPrOH and 0.24 g 28% ammonia was fed in over 180 min. Upon completion of the feeds, a mixture of 71.76 g demineralized water, 0.80 g ascorbic acid and 0.001 g iron (II) sulfate was added followed by a mixture of 7.97 g demineralized water and 1.99 g t-butyl perbenzoate. The reaction was held for 15 minutes and then a mixture of 29.72 g demineralized water and 29.72 g dimethylethanolamine was added and held for 60 min. Then, a mixture of 119.61 g butanol, 119.61 g 2-butoxyethanol and 119.61 g Dowanol PnB was added and held 60 min. The mixture was cooled and 247.19 g demineralized water added followed by a mixture of 80.63 g butanol, 80.63 g 2-butoxyethanol and 80.63 g Dowanol PnB was added. Then, a mixture of 11.5 g dimethylethanolamine in 11.5 g demineralized water was added and mixed 30 min.

Example 10

To 2288.50 g demineralized water was added a mixture of 1.71 g of 70% dodecylbenzene sulfonic acid in iPrOH, 7.97 g demineralized water and 0.24 g 28% ammonia. The mixture was heated to 80° C. under a nitrogen sparge. When temperature was reached, the sparge was replaced with a nitrogen blanket. 79.74 g of a monomer mixture with composition; 68.5% styrene, 12% methacrylic acid, 9.5% 2-ethylhexyl acrylate, 2% butanediol dimethacrylate and 8% hydroxypropyl methacrylate was added and mixed for 15 min. Then, a mixture of 30.67 g demineralized water and 3.99 g ammonium persulfate was added and held for 15 min. Following the hold, 717.65 g of a monomer mixture identical to the one above was fed in over 180 min. Additionally, a co-feed consisting of 119.61 g demineralized water, 1.71 g of 70% dodecylbenzene sulfonic acid in iPrOH and 0.24 g 28% ammonia was fed in over 180 min. Upon completion of the feeds, a mixture of 71.76 g demineralized water, 0.80 g ascorbic acid and 0.001 g iron (II) sulfate was added followed by a mixture of 7.97 g demineralized water and 1.99 g t-butyl perbenzoate. The reaction was held for 15 minutes and then a mixture of 29.72 g demineralized water and 29.72 g dimethylethanolamine was added and held for 60 min. Then, a mixture of 119.61 g butanol, 119.61 g 2-butoxyethanol and 119.61 g Dowanol PnB was added and held 60 min. The mixture was cooled and 247.19 g demineralized water added followed by a mixture of 80.63 g butanol, 80.63 g 2-butoxyethanol and 80.63 g Dowanol PnB was added. Then, a mixture of 18.8 g dimethylethanolamine in 18.8 g demineralized water was added and mixed 30 min.

Example 11

To 2288.50 g demineralized water was added a mixture of 1.71 g of 70% dodecylbenzene sulfonic acid in iPrOH, 7.97 g demineralized water and 0.24 g 28% ammonia. The mixture was heated to 80° C. under a nitrogen sparge. When temperature was reached, the sparge was replaced with a nitrogen blanket. 79.74 g of a monomer mixture with composition; 65.5% methyl methacrylate, 12% methacrylic acid, 12.5% butyl acrylate, 2% butanediol dimethacrylate and 8% hydroxypropyl methacrylate was added and mixed for 15 min. Then, a mixture of 30.67 g demineralized water and 3.99 g ammonium persulfate was added and held for 15 min. Following the hold, 717.65 g of a monomer mixture identical to the one above was fed in over 180 min. Additionally, a co-feed consisting of 119.61 g demineralized water, 1.71 g of 70% dodecylbenzene sulfonic acid in iPrOH and 0.24 g 28% ammonia was fed in over 180 min. Upon completion of the feeds, a mixture of 71.76 g demineralized water, 0.80 g ascorbic acid and 0.001 g iron (II) sulfate was added followed by a mixture of 7.97 g demineralized water and 1.99 g t-butyl perbenzoate. The reaction was held for 15 minutes and then a mixture of 39.6 g demineralized water and 39.6 g dimethylethanolamine was added and held for 60 min. Then, a mixture of 119.61 g butanol, 119.61 g 2-butoxyethanol and 119.61 g Dowanol PnB was added and held 60 min. The mixture was cooled and 257.07 g demineralized water added followed by a mixture of 80.63 g butanol, 80.63 g 2-butoxyethanol and 80.63 g Dowanol PnB was added. Then, 120 g demineralized water was added and mixed 30 min.

Example 12

To 2283.95 g demineralized water was added a mixture of 1.70 g of 70% dodecylbenzene sulfonic acid in iPrOH, 7.96 g demineralized water and 0.24 g 28% ammonia. The mixture was heated to 80° C. under a nitrogen sparge. When temperature was reached, the sparge was replaced with a nitrogen blanket. 79.59 g of a monomer mixture with composition; 14.15% styrene, 12% methacrylic acid, 65.35% butyl methacrylate, 0.5% glycidyl methacrylate and 8% hydroxypropyl methacrylate was added and mixed for 15 min. Then, a mixture of 30.61 g demineralized water and 3.98 g ammonium persulfate was added and held for 15 min. Following the hold, 716.23 g of a monomer mixture identical to the one above was fed in over 180 min. Additionally, a co-feed consisting of 119.37 g demineralized water, 1.70 g of 70% dodecylbenzene sulfonic acid in iPrOH and 0.24 g 28% ammonia was fed in over 180 min. Upon completion of the feeds, a mixture of 71.62 g demineralized water, 0.80 g ascorbic acid and 0.001 g iron (II) sulfate was added followed by a mixture of 7.96 g demineralized water and 1.99 g t-butyl perbenzoate. The reaction was held for 15 minutes and then a mixture of 29.66 g demineralized water and 29.66 g dimethylethanolamine was added and held for 60 min. Then, a mixture of 119.37 g butanol, 119.37 g 2-butoxyethanol and 119.37 g Dowanol PnB was added and held 60 min. The mixture was cooled and 246.70 g demineralized water added followed by a mixture of 80.63 g butanol, 80.63 g 2-butoxyethanol and 80.63 g Dowanol PnB was added. Then, a mixture of 9.0 g dimethylethanolamine in 9.0 g demineralized water was added and mixed 30 min.

Example 13

To 1187 g demineralized water was added a mixture of 5 g of CMA80I and 1 g of ABC. The resulting mixture was upheated to 80 C with nitrogen purge. At batch temperature, the purge was turned off and 6 g of styrene and 15 g ethyl acrylate were added and mixed for 10 minutes. 5 g of APS and 19 g of water were added to the resulting mixture and held for 20 minutes. To the resulting mixture, a feed of 210 g styrene, 161 g ethyl acrylate, 31 g methacrylic acid and 1.5 g of MT70 was added over 100 minutes while maintaining 80 C. A shell feed of 287 g of styrene, 232 g of ethyl acrylate, 52 g of methacrylic acid, 30 g of glycidyl methacrylate and 1.5 g of MT70 were added. At the end of the feeds, the resulting mixture was held for 20 minutes. To the resulting mixture, 1 g of ascorbic acid, 10 g of water and 1 mg of ferrous sulfate were added and the mixture was held for 3 minutes. Next, 2.6 g of t-butyl peroxide and 11 g of water were added and the mixture was held for 45 minutes at 80° C. The pump was rinsed. 1356 g of water were added at a stabilize temperature of 75° C. Next, a premix of 136 g of dimethylethanolamine and 309 g of water were added to the batch over 40 minutes at 75° C. The batch was held for 30 minutes at 75° C. The batch was cooled to 38° C. and filtered.

Example 14

To 1188 g demineralized water was added a mixture of 5 g of Aersol MA-80I and 1 g of ammonium bicarbonate. The resulting mixture was upheated to 80° C. with a nitrogen purge. At batch temperature, the purge was turned off and 6 g of styrene and 15 g of ethyl acrylate were added and mixed for 10 minutes. 5 g of ammonium persulfate and 19 g of water were added to the resulting mixture and held for 20 minutes. To the resulting mixture, a feed of 206 g of styrene, 134 g of ethyl acrylate, 21 g of glycerol dimethacrylate, 31 g of methacrylic acid and 1.5 g of Monawet MT70 was added over 100 minutes while maintaining 80° C. A shell feed of 303 g of styrene, 188 g of ethyl acrylate, 62 g of methacrylic acid, 21 g of glycerol dimethacrylate and 1.5 g of MT70 were added. At the end of the feeds, the resulting mixture was held for 20 minutes. To the resulting mixture, 1 g of ascorbic acid, 10 g of water and 1 mg of ferrous sulfate were added and the mixture was held for 3 minutes. Next, 2.6 g of t-butyl peroxide and 11 g of water were added and the mixture was held for 45 minutes at 80° C. The pump was rinsed. 1356 g of water were added at a stabilize temperature of 75° C. Next, a premix of 136 g of dimethylethanolamine and 309 g of water were added to the batch over 40 minutes at 75° C. The batch was held for 30 minutes at 75° C. The batch was cooled to 38° C. and filtered.

Example 15

Preparation of Hydroxyl Functional Oil Polyol 11.0 grams of propylene glycol, 112.0 grams of epoxidized soy bean oil, 30.9 grams of methyl amyl ketone and 0.036 grams of Nacure A-218 (available from King Industries) were stirred under nitrogen and warmed to 150° C. The initial exotherm was controlled at <155° C., and the mixture was held at 150° C. for about 2 hours then cooled. Oxirane titration indicated >99.9% conversion of the epoxide groups. Preparation of Hydroxyl Functional Oil Polyol Graft Copolymer 100 grams of hydroxyl functional oil polyol was mixed with 80 grams of Aromatic 100 and 60 grams methyl amyl ketone and heated to 130° C. under nitrogen. 6.4 grams of hydroxy propyl methacrylate, 36.8 grams of styrene, 36.8 grams of butyl acrylate and 1.6 grams of t-butyl peroxy benzoate were fed into the mixture over 2 hours. The resultant mixture was held for 1 hour at 130° C. and cooled.

Example 16

Preparation of Hydroxyl Functional Oil Polyol 50.9 grams of diethylene glycol and 150 grams of epoxidized soy bean oil were added to a 1 liter flask. 0.02 grams of Nacure A-218 (available from King Industries) was added to the flask at 20° C. and the mixture was stirred under nitrogen and warmed to 160° C. The initial exotherm was controlled at <165° C., and the mixture was held at 160° C.

for about 3 hours. Oxirane titration indicated >99.9% conversion of the epoxide groups. 50.3 grams of butyl cellosolve was added on cool down to give 80% NV.

Example 17

Preparation of Hydroxyl Functional Oil Polyol 50.0 grams of neopentyl glycol and 150 grams of epoxidized soy bean oil were added to a 1 liter flask. 0.02 grams of Nacure A-218 (available from King Industries) was added to the flask at 20° C. and the mixture was stirred under nitrogen and warmed to 160° C. The initial exotherm was controlled at <165° C., and the mixture was held at 160° C. for about 3 hours. Oxirane titration indicated >99.9% conversion of the epoxide groups. 50.3 grams of butyl cellosolve was added on cool down to give 80% NV.

Example 18

Preparation of Hydroxyl Functional Oil Polyol 185.500 grams of propylene glycol, 812.450 grams of epoxidized soy bean oil and 0.206 grams of Nacure A-218 (available from King Industries) were stirred under nitrogen and warmed to 150° C. (141 grams of propylene glycol remained as unreacted solvent). The initial exotherm was controlled at <155° C., and the mixture was held at 150° C. for about 2 hours then cooled. Oxirane titration indicated >99.9% conversion of the epoxide groups.

Example 19

Preparation of Hydroxyl Functional Oil Polyol Graft Copolymer 998.156 grams of the hydroxyl functional oil polyol of Example 18 was mixed with 1000 grams of butyl cellosolve and heated to 100° C. under nitrogen. 100.000 grams of hydroxy propyl methacrylate, 450.000 grams of methyl methacrylate, 450.000 grams of butyl methacrylate, and 20.000 grams of dibenzoyl peroxide were fed into the mixture over 2 hours. The resultant mixture was held for 1 hour at 100° C., 677 g methyl amyl ketone was added, and the resultant mixture was cooled to form a hydroxyl functional oil polyol graft copolymer.

Example 20

Preparation of Hydroxyl Functional Oil Polyol Graft Copolymer Emulsion 62.5 grams of hydroxyl functional oil polyol from Example 18, 27.5 grams of n-butanol and 30 grams of butyl cellosolve were charged in a flask and heated to 100° C. 40 grams of methyl methacrylate, 40 grams of butyl methacrylate, 20 grams of methacrylic acid and 3.5 grams of dibenzoyl peroxide were added to the flask over two hours while maintaining the temperature at 100° C. The resulting mixture was held for an additional hour at 100° C. 16.6 grams of dimethylethanolamine and 30 grams of deionized water were added to the resulting mixture over 30 minutes while allowing the temperature to fall to 80° C. 331 grams of deionized water were added to the resulting mixture over one hour while allowing the temperature to fall to 40° C. to form a hydroxyl functional oil polyol graft copolymer emulsion.

Example 21

Preparation of Hydroxyl Functional Oil Polyol Graft Copolymer 188.223 grams of the hydroxyl functional oil polyol of Example 18 and 190.36 grams of butyl cellosolve were charged in a flask and heated to 100° C. 39.4148 grams of methyl methacrylate, 104.168 grams of butyl methacrylate, 45.7493 grams of methacrylic acid and 3.78664 grams of dibenzoyl peroxide were fed into the mixture over 2 hours at 100° C. The resultant mixture was held for 30 minutes at 100° C., then 1.41999 grams of t-butyl peroctoate and 1.41999 grams of methyl amyl ketone were added followed by a hold for 30 minutes at 100° C. Next, 1.41999 grams of t-butyl peroctoate and 1.41999 grams of methyl amyl ketone were added to the resultant mixture followed by a hold for 30 minutes at 100° C. Following the hold, 1.41999 grams of t-butyl peroctoate and 1.41999 grams of methyl amyl ketone were added followed by another hold for 90 minutes at 100° C. 677 g methyl amyl ketone was added, and the resultant mixture was cooled to form a hydroxyl functional oil polyol graft copolymer.

Example 22

Preparation of Hydroxyl Functional Oil Polyol Graft Copolymer

The system was set for a standard reflux process with a nitrogen sparge. 335 g of an epoxidized soybean oil were charged to a reactor. A premix of 77 g of propylene glycol and 0.1 g of Nacure A218 were added to the reactor. The resulting mixture was heated at a rate of 1.6° C./min (100° C./hr) to 140° C. A strong exotherm carried the reaction to a temperature of 150° C. The $T_{max}$ was limited to 160° C. The resulting mixture was held at 150° C. Samples were taken after 30 min above 150° C. The resulting mixture was held for EEW>60,000. The resulting mixture was cooled to 100° C. while adding 182 g of butanol and 125 g of butyl cellosolve. To the resulting mixture, the following group of monomers was added allowing time for C513 to dissolve, then the remainder of the monomers were added (264 g methyl methacrylate, 264 g of butyl methacrylate, 132 g of methacrylic acid, 23 g of benzoyl peroxide, 52 g of butyl cellosolve. The monomers were fed over 2 hours at 100° C. To the resulting mixture, 21 g of butyl cellosolve was added as a line rinse. The resulting mixture was held for 30 minutes at 100° C. 5 g of t-butyl peroctoate was added and rinsed with 5 g of butyl cellosolve. The resulting mixture was held for 30 minutes. Next, 5 g of t-butyl peroctoate was added and rinsed with 5 g of butyl cellosolve, followed by a hold of 30 minutes. Next, 5 g of t-butyl peroctoate was added and rinsed with 5 g of butyl cellosolve, followed by a hold of 90 minutes. The resulting mixture was dropped to a reducing tank. A premix of 110 g of dimethylethanolamine and 198 g of water was added to the reducing tank over 15 minutes. The resulting mixture was held for 30 minutes and maintained a temperature of 85° C. to 90° C. To the resulting mixture, 2187 g of water was added over 45-60 minutes. The resulting mixture was maintained a temperature of 85° C. to 90° C. The resulting mixture was then filtered.

Example 23

Preparation of Coating Composition by blending the Latex of Example 13 and the Hydroxyl Functional Oil Polyol Graft Copolymer of Example 19

149 g of F428, 680 g of Phenodur 6535, 5 g of super phosphoric acid and 121 g of Dowanol EB were added to a mixing pot and mixed for 15 min using a standard uplift mixing blade between 300-500 rpm. To the resulting mixture, 418 g of the Oil Polyol Graft Copolymer from Example 19 was added over 5 min and was mixed for 15 min. A premix of 22 g of dimethylethanolamine, 22 g of water, and 324 g of butanol was added to the mix and held for 15 minutes. To the resulting mixture, 135 g of water was added and mixed for 15 min. To the resulting emulsion, 1720 g of the aminated latex of Example 13 was added over 20 minutes. To the resulting mixture, a premix of 22 g of Surfynol 104 and 43 g of butanol were added and mixed for 15 min. Next, a premix of 53 g of NanoByk 3840 and 53 g of water were added and mixed for 15 min. Next, the resulting mixture was adjusted with water to 100-250 cps on a Brookfield Viscometer.

The resulting composition was sprayed on the interior of two-piece food cans at 250 mg/can film weight and evaluated for performance. The evaluation results are reported below:

Coverage: 0.4 mA, no blister, good appearance.
Particle Size 239 nm
Simulant tests were performed and rated for corrosion and adhesion loss on upright cans and inverted (Head Space/Liquid—0=none, 2=very slight, 5=peeling off the panel):
2% Brine (90'@250 F)
Corrosion HS/Liquid 0/0, Adhesion HS/Liquid 0/0,
Inverted Corrosion HS/Liquid 2/1, Inverted Adhesion HS/Liquid 2/0
1% Lactic (90'@250 F)
Blush HS/Liquid Adhesion1/2, HS/Liquid 0/1

Example 24

Preparation of Coating Composition by blending the Latex of Example 14 and the Hydroxyl Functional Oil Polyol Graft Copolymer of Example 18

75 g of EP 560 340 g of Phenodur 6520, 3 g of super phosphoric acid and 71 g of Dowanol EB were added to a mixing pot and mixed for 15 min using a standard uplift mixing blade between 300-500 rpm. To the resulting mixture, 210 g of the Oil Polyol Graft Copolymer from Example 18 was added over 5 min and was mixed for 15 min. A premix of 8 g of dimethylethanolamine, 8 g of water and 189 g of butanol were added to the emulsion and mixed for 15 min. To the resulting mixture, 189 g of water was added and mixed for 15 min. To the resulting mixture, 813 g of the aminated latex of Example 14 was added over 20 minutes. To the resulting mixture 124 g of butanol was added and mixed for 15 min. Next, a premix of 27 g of NanoByk 3840 and 27 g of water were added and mixed for 15 min. Next, the resulting mixture was adjusted with water to 100-250 cps on a Brookfield Viscometer.

The resulting composition was sprayed on the interior of two-piece food cans at 250 mg/can film weight and evaluated for performance. The evaluation results are reported below:

Coverage: 0.4 mA, no blister, good appearance.
Particle Size 240 nm
Simulant tests were performed and rated for corrosion and adhesion loss on upright cans and inverted (Head Space/Liquid—0=none, 2=very slight, 5=peeling off the panel):
2% Brine (90'@250 F)
Corrosion HS/Liquid 0/0, Adhesion HS/Liquid 0/0,
Inverted Corrosion HS/Liquid 2/1, Inverted Adhesion HS/Liquid 1/0
1% Lactic (90'@250 F)
Blush HS/Liquid Adhesion 0/1, HS/Liquid 0/1

Example 25

Preparation of Coating Composition by blending the Latex of Example 14 and the Hydroxyl Functional Oil Polyol Graft Copolymer of Example 19

75 g of EP560, 340 g of Phenodur 6532, 2.7 g of super phosphoric acid and 71 g of Dowanol EB were added to a mixing pot and mixed for 15 min using a standard uplift mixing blade between 300-500 rpm. To the resulting mixture, 209 g of the Oil Polyol Graft Copolymer from Example 19 was added over 5 min and was mixed for 15 min. A premix of 9 g of dimethylethanolamine, 9 g of water and 324 g of butanol was added to the emulsion and mixed for 15 min. To the resulting mixture, 65 g of water was added. To the resulting mixture, 815 g of the aminated latex of Example 14 was added over 30 minutes. To the resulting mixture, 124 g of butanol was added and mixed for 15 min. Next, a premix of 27 g of NanoByk 3840 and 27 g of water were added and mixed for 15 min. Next, the resulting mixture was adjusted with water to 100-250 cps on a Brookfield Viscometer.

The resulting composition was sprayed on the interior of two-piece food cans at 250 mg/can film weight and evaluated for performance. The evaluation results are reported below:

Coverage: 0.4 mA, no blister, good appearance.
Particle Size 239 nm
Simulant tests were performed and rated for corrosion and adhesion loss on upright cans and inverted (Head Space/Liquid—0=none, 2=very slight, 5=peeling off the panel):
2% Brine (90'@250 F)
Corrosion HS/Liquid 0/0, Adhesion HS/Liquid 0/0,
Inverted Corrosion HS/Liquid 2/1, Inverted Adhesion HS/Liquid 1/0
1% Lactic (90'@250 F)
Blush HS/Liquid Adhesion 1/2, HS/Liquid 0/1

Flavor Testing Procedure
Food Cans
Fill cans with 400 ml of mineral water (Aquafina brand). Vacuum seal cans with aluminum foil covering the inside portion of the lid. This is to ensure there is no flavor pick up from the internal coating on the lid. Process cans in a retort at 250° F. for 15 minutes. Cool cans and transfer contents into fresh cans and reprocess in a retort at 250° F. for 15 minutes. This process is repeated three times. Three cans are required per variable. After the third extract, the cans are cooled. Water samples are placed in glass containers for taste testing. They are marked and placed randomly. Blank, control 523 is taste tested along with variables to be tested.

Aluminum Foil Sheets

Aluminum sheets are coated on both sides and cut to 160 cm² area. The 160 cm2 sheets are further cut into three equal strips. The strips are accordion and placed in a glass jar (jelly jar from Ball Corp). About 80 ml of mineral water is transferred to the glass jar and strips immersed. The jar is sealed with aluminum foil covering the inside portion of the lid. Variables along with control and 523 are processed in a retort at 250° F. for 30 minutes, after which the samples are cooled and strips removed. The water samples are put in glass jars and taste tested. The Bham rating scale was used.

What is claimed is:

1. A coating composition for coating a food container, the coating composition comprising:
an emulsion of a hydroxyl functional oil polyol graft copolymer and a crosslinker, the weight ratio of the crosslinker to the hydroxyl functional oil polyol graft copolymer being between about 5:1 and about 2:1, wherein the hydroxyl functional oil polyol graft copolymer functions as a polymeric surfactant; and
an aqueous latex emulsion.

2. The coating composition of claim 1, wherein the aqueous latex emulsion has an acid value of at least about 35 based on the solids content of the latex.

3. The coating composition of claim 1, wherein the coating composition comprises an amount of hydroxyl functional oil polyol graft polymer up to 12 pph of the hydroxyl functional oil polyol graft copolymer or an amount of crosslinker up to 50 pph of the crosslinker.

4. The coating composition of claim 1, wherein the hydroxyl functional oil polyol graft copolymer is a reaction product of a hydroxyl functional oil polyol, an ethylenically unsaturated monomer component, and an initiator, wherein the hydroxyl functional oil polyol is a product of a reaction of epoxidized vegetable oil and a hydroxyl functional material.

5. The coating composition of claim 1, wherein the aqueous latex emulsion is a reaction product of a monomer emulsion and an initiator and wherein the monomer emulsion is formed from a mixture of an ethylenically unsaturated monomer component in a carrier.

6. The coating composition of claim 5, wherein the aqueous latex emulsion is the reaction product of the monomer emulsion, the initiator, and a neutralizer.

7. The coating composition of claim 4, wherein the ethylenically unsaturated monomer component is in a mixture with a stabilizer.

8. The coating composition of claim 7, wherein the stabilizer comprises dodecylbenzene sulfonic acid.

9. The coating composition of claim 7, wherein the stabilizer is present in an amount from about 0.1% to about 2.0% by weight polymeric solids in the latex emulsion.

10. The coating composition of claim 7, wherein the mixture includes at least one base chosen from ammonia, dimethylethanolamine, or 2-dimethylamino-2-methyl-1-propanol.

11. The coating composition of claim 4, wherein the hydroxyl functional material is at least one of propylene glycol, 1,3-propane diol, ethylene glycol, neopentyl glycol, trimethylol propane, diethylene glycol, a polyether glycol, benzyl alcohol, 2-ethylhexanol, a polyester, a polycarbonate, or a hydroxyl functional polyolefin.

12. The coating composition of claim 4, wherein the acid catalyst is at least one of a sulfonic acid, a triflic acid, a triflate salt of a metal of Group HA, IIB, DIA, MB, or VIIIA of the Periodic Table of Elements (according to the IUPAC 1970 convention), or a mixture of said triflate salts.

13. The coating composition of claim 4, wherein the ethylenically unsaturated monomer composition comprises an acetoacetate compound.

14. A method of preparing a coating for coating a can or packaging comprising: a) preparing a hydroxyl functional oil polyol graft copolymer; b) preparing an aqueous latex emulsion; c) preparing a crosslinker; and d) blending the latex emulsion and the crosslinker then adding the hydroxyl functional oil polyol graft copolymer to form the coating composition, where the weight ratio of the crosslinker to the hydroxyl functional oil polyol graft copolymer is between about 5:1 and about 2:1, and wherein the hydroxyl functional oil polyol graft copolymer functions as polymeric surfactant.

15. The method of claim 14, wherein the latex emulsion is prepared by a method comprising:
i) mixing an ethylenically unsaturated monomer component in a carrier to form a monomer emulsion; and
ii) reacting the monomer emulsion with an initiator to form the latex emulsion.

16. The method of claim 14, wherein the hydroxyl functional oil polyol graft copolymer is prepared by a method comprising:
i) reacting an epoxidized vegetable oil with a hydroxyl functional material in the presence of an acid catalyst to form a hydroxyl functional oil polyol; and
ii) reacting the hydroxyl functional oil polyol with an ethylenically unsaturated monomer component in the presence of an initiator to form the hydroxyl functional oil polyol graft copolymer.

17. The method of claim 14, wherein the latex emulsion is reacted with a neutralizer.

18. The method of claim 14, wherein the ethylenically unsaturated monomer component is mixed with a stabilizer to form the monomer emulsion.

19. The method of claim 18, wherein the stabilizer comprises dodecylbenzene sulfonic acid.

20. The method of claim 18, wherein the stabilizer is present in an amount from about 0.1% to about 2.0% by weight polymeric solids in the latex emulsion.

21. The method of claim 18, wherein the mixing occurs in the presence of a base comprising ammonia, dimethylethanolamine, 2-dimethylamino-2-methyl-1-propanol, or a combination thereof.

22. The method of claim 16, wherein the hydroxyl functional material comprises propylene glycol, 1,3-propane diol, ethylene glycol, neopentyl glycol, trimethylol propane, diethylene glycol, a polyether glycol, benzyl alcohol, 2-ethylhexanol, a polyester, a polycarbonate, a hydroxyl functional polyolefin, or a combination thereof.

23. The method of claim 16, wherein the acid catalyst comprises a strong acid such as a sulfonic acid, a triflic acid, a triflate salt of a metal of Group IIA, IIB, IIIA, IIIB, or VIIIA of the Periodic Table of Elements (according to the IUPAC 1970 convention), a mixture of said triflate salts, or a combination thereof.

24. A can or packaging for containing food, wherein the can or packaging is coated with the coating composition of claim 1.

25. The coating composition of claim 14, wherein the weight ratio of the latex emulsion to the hydroxyl fiuictional oil polyol graft copolymer is between about 4:1 and about 2:1.

26. The coating composition of claim 1, wherein the crosslinker is at least one of benzoguanamine, benzoguanamine formaldehyde, glycoluril, melamine formaldehyde, phenol formaldehyde, or urea formaldehyde.

27. The coating composition of claim 1, wherein the crosslinker is at least one of a phenolic crosslinker, an isocyanate crosslinker, or a blocked isocyanate crosslinker.

28. The coating composition of claim 1, wherein the crosslinker is a phenolic crosslinker.

29. The coating composition of claim 1, wherein latex particles in the aqueous latex emulsion have a particle size larger than 100 nanometers.

30. The coating composition of claim 29, wherein the latex particles have particle sizes in a range from about 250 nanometers to about 350 nanometers.

\* \* \* \* \*